(12) United States Patent
Harada (10) Patent No.: US 9,429,440 B2
(45) Date of Patent: Aug. 30, 2016

(54) DRIVING ACTION DETERMINATION FOR TRAVEL ROUTE EXIT EVENT

(71) Applicant: Toyota Motor Engineering & Manufacturing North America, Inc., Erlanger, KY (US)

(72) Inventor: Masahiro Harada, Novi, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 69 days.

(21) Appl. No.: 14/562,763

(22) Filed: Dec. 7, 2014

(65) Prior Publication Data

US 2016/0161267 A1 Jun. 9, 2016

(51) Int. Cl.
| | |
|---|---|
| *G01C 22/00* | (2006.01) |
| *G05D 1/00* | (2006.01) |
| *G01C 21/34* | (2006.01) |
| *B60W 30/16* | (2012.01) |
| *G01D 1/02* | (2006.01) |
| *G01C 21/36* | (2006.01) |
| *G05D 1/02* | (2006.01) |

(52) U.S. Cl.
CPC .............. *G01C 21/34* (2013.01); *B60W 30/16* (2013.01); *G01C 21/3658* (2013.01); *G01D 1/02* (2013.01); *G05D 1/02* (2013.01); *G05D 1/0212* (2013.01)

(58) Field of Classification Search
None
See application file for complete search history.

(56) References Cited

U.S. PATENT DOCUMENTS

| | | | |
|---|---|---|---|
| 6,842,687 B2 | 1/2005 | Winner et al. | |
| 7,979,174 B2 * | 7/2011 | Fregene | B60W 30/16 701/23 |
| 2010/0057321 A1 * | 3/2010 | Randler | B60W 30/16 701/96 |
| 2012/0078484 A1 | 3/2012 | Kato | |
| 2015/0344033 A1 * | 12/2015 | Fukuda | B60W 30/16 701/117 |

FOREIGN PATENT DOCUMENTS

| | | | |
|---|---|---|---|
| JP | 2003063273 A | 3/2003 | |
| JP | 2005149402 A | 6/2005 | |
| JP | 2006251888 A | 9/2006 | |
| JP | 2009248892 A | 10/2009 | |
| JP | 2009301132 A | 12/2009 | |
| JP | 4561675 B2 | 10/2010 | |

* cited by examiner

*Primary Examiner* — Yonel Beaulieu
*Assistant Examiner* — Lail Kleinman
(74) *Attorney, Agent, or Firm* — Christopher G. Darrow; Darrow Mustafa PC (57) ABSTRACT

Arrangements relate to determining a driving action for an autonomous vehicle. An exit event along a current road of a travel route of the autonomous vehicle can be identified. At least one forward vehicle between the autonomous vehicle and the exit event can be detected. A driving action to take relative to the at least one forward vehicle can be determined based on one or more inputs. Such inputs can include a determined availability or unavailability of passing the at least one forward vehicle and/or a determined sufficiency or insufficiency of distance between the at least one forward vehicle and the exit event. The autonomous vehicle can be caused to implement the determined driving action. The driving action can be, for example, remaining behind the at least one forward vehicle, passing the at least one forward vehicle or prompting an occupant of the autonomous vehicle to select a driving action.

19 Claims, 3 Drawing Sheets

DRIVING ACTION DETERMINATION FOR TRAVEL ROUTE EXIT EVENT

FIELD

The subject matter described herein relates in general to vehicles having an autonomous operational mode and, more particularly, to the maneuvering of such vehicles when approaching an exit event.

BACKGROUND

Some motor vehicles include driving assistance systems that can assist a driver in the operation of such vehicles. Driving assistance systems typically include sensors configured to detect information about the surrounding environment, such as the presence of other vehicles. Such driving assistance systems include computing systems that are configured to process the detected information to inform a driver of options for navigating the vehicle in the surrounding environment. For instance, some motor vehicles are configured to send an indication to a driver when there is an opportunity to pass another vehicle.

SUMMARY

In one respect, the present disclosure is directed to a method of determining a driving action for an autonomous vehicle. The method includes identifying an exit event along a current road of a travel route of the autonomous vehicle. The method also includes detecting at least one forward vehicle between the autonomous vehicle and the exit event. Further, the method includes determining, using a processor, a driving action to take relative to the at least one forward vehicle. Such determining is based on at least one of a determined availability or unavailability of passing the at least one forward vehicle and a determined sufficiency or insufficiency of distance between the at least one forward vehicle and the exit event. In addition, the method includes causing the autonomous vehicle to implement the determined driving action.

In another respect, the present disclosure is directed to a system for an autonomous vehicle. The system includes a sensor system configured to detect one or more forward vehicles between an autonomous vehicle and an exit event along a current road of a travel route of the autonomous vehicle. The system also includes a processor operatively connected to the sensor system. The processor is programmed to initiate executable operations. The executable operations include determining a driving action to take relative to the at least one forward vehicle. Such determining is based on at least one of a determined availability or unavailability of passing the at least one forward vehicle and a determined sufficiency or insufficiency of distance between the at least one forward vehicle and the exit event. The executable operations further include causing the autonomous vehicle to implement the determined driving action.

In still another respect, the present disclosure is directed to a computer program product for determining a driving action for an autonomous vehicle approaching an exit event. The computer program product includes a computer readable storage medium having program code embodied therewith. The program code is executable by a processor to perform a method. The method includes identifying an exit event along a current road of a travel route of the autonomous vehicle. The method also includes detecting at least one forward vehicle between the autonomous vehicle and the exit event. The method further includes determining a driving action to take relative to the at least one forward vehicle. Such determining is based on at least one of a determined availability or unavailability of passing the at least one forward vehicle and a determined sufficiency or insufficiency of distance between the at least one forward vehicle and the exit event. The method includes causing the autonomous vehicle to implement the determined driving action.

DETAILED DESCRIPTION

This detailed description relates to determining a suitable driving action for an autonomous vehicle near an exit event. More particularly, such a determination can be made when one or more other vehicles are detected in front of and in the same lane as the autonomous vehicle. Examples of suitable driving actions can include passing the detected vehicle(s) or remaining behind the detected vehicle(s). The present detailed description relates to systems, methods and computer program products that incorporate such features. In at least some instances, such systems, methods and computer program products can assist in minimizing driver inputs to and/or improving performance of the autonomous vehicle.

Figure 2:
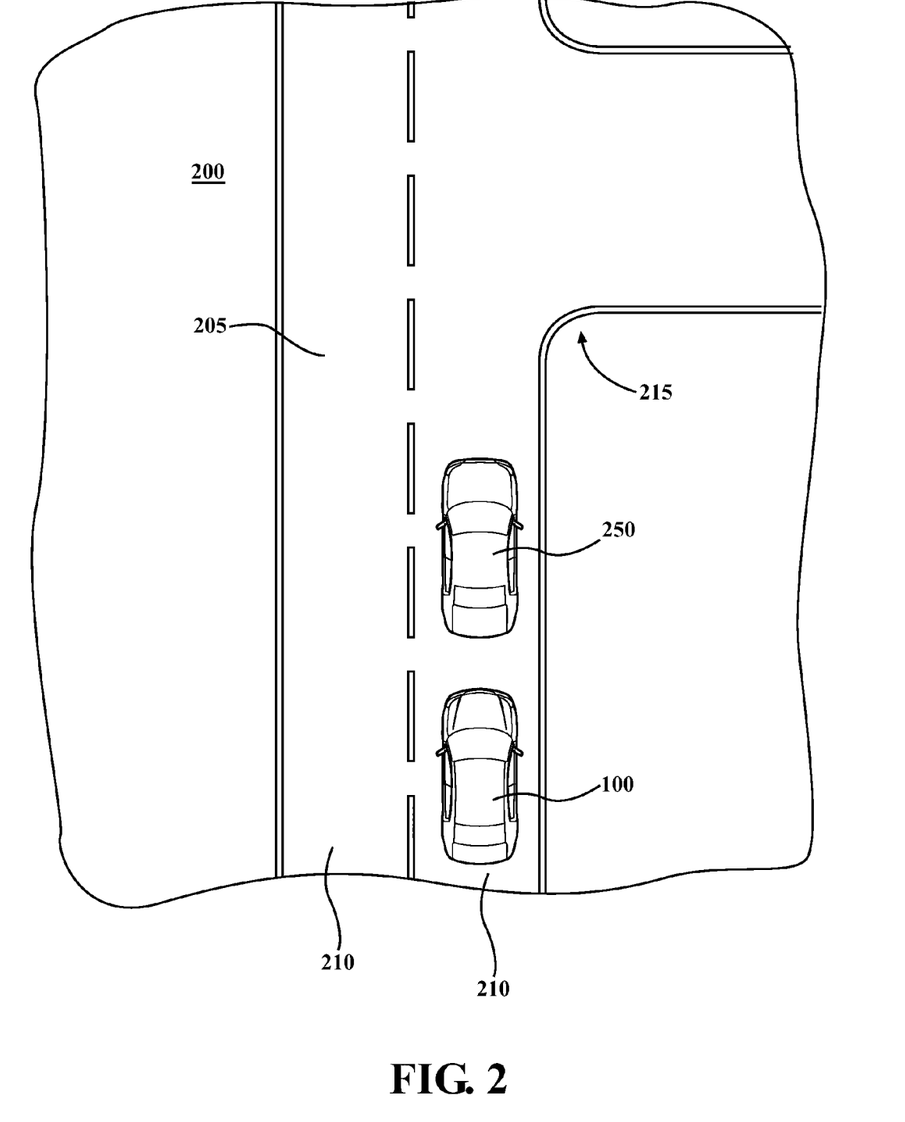
FIG. 2 is an example of a portion of a travel route for an autonomous vehicle, the travel route including an exit event.
Figure 3:
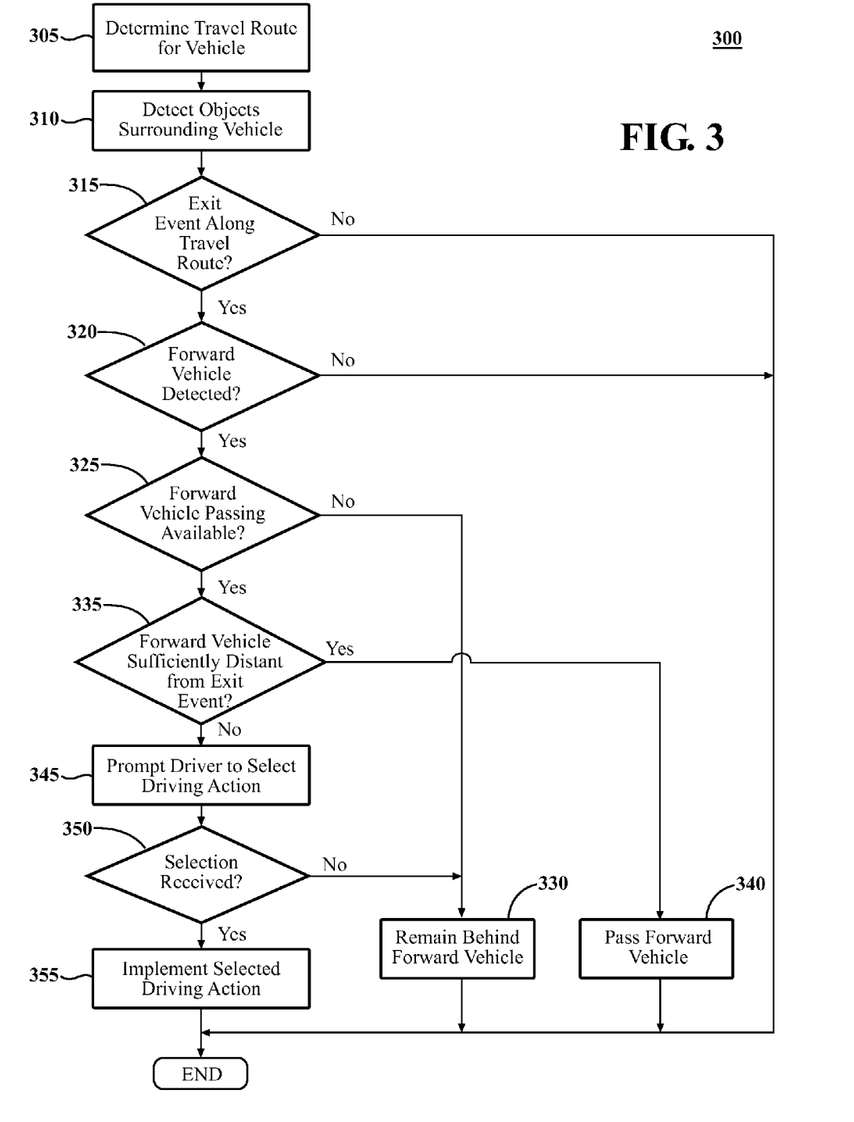
FIG. 3 is an example of a method of determining a driving action for an exit event.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
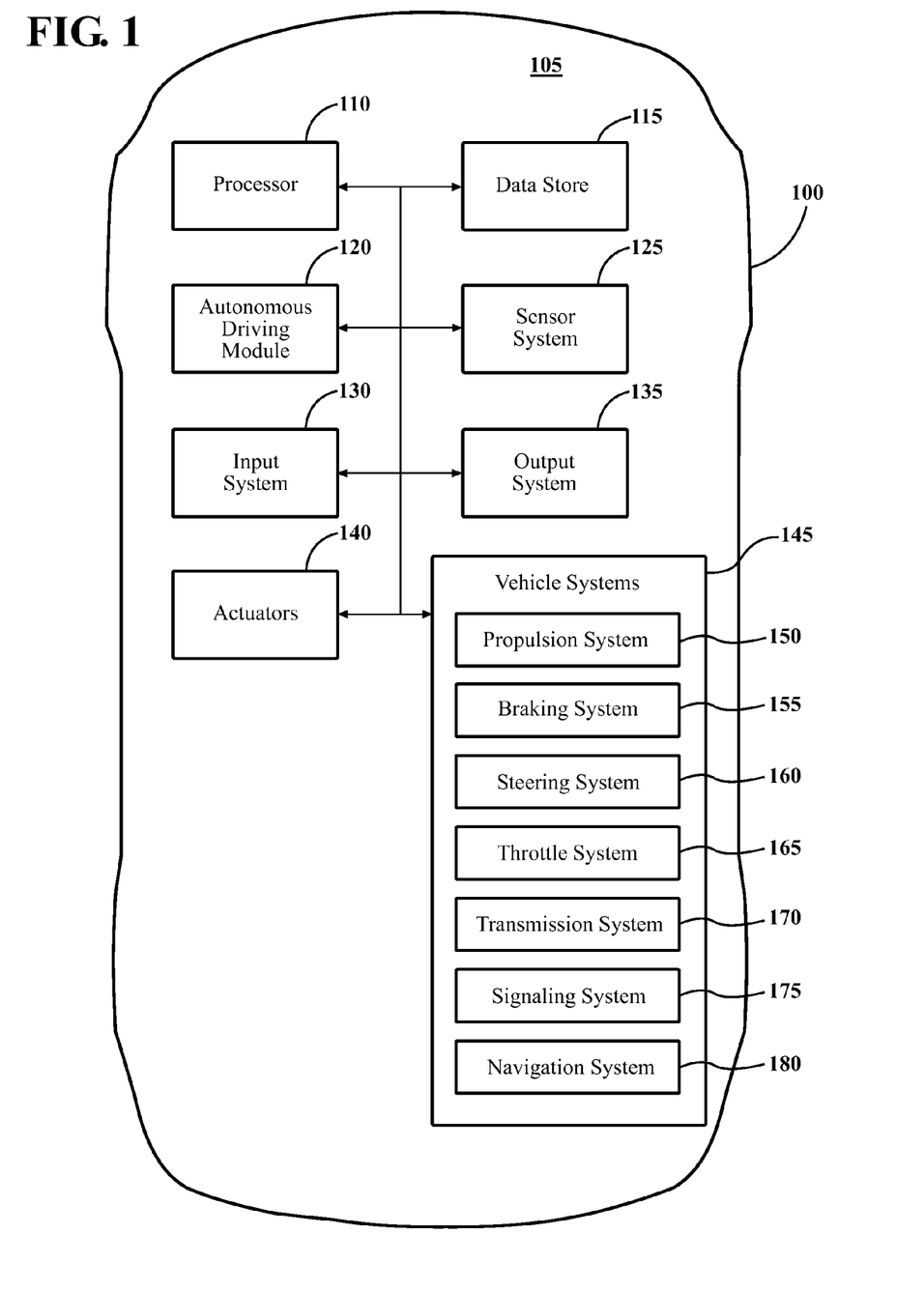
FIG. 1 is an example of a system for an autonomous vehicle for determining a driving action for an exit event.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode using one or more computing systems to navigate and/or maneuver a vehicle along a travel route with minimal or no input from a human driver. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of a vehicle along a travel route is performed by a human driver.

The vehicle 100 can include various elements which may be a part of an autonomous driving system 105. Some of the possible elements of the autonomous driving system 105 are shown in FIG. 1 and will now be described. It will be understood that it is not necessary for the system 105 to have all of the elements shown in FIG. 1 or described herein. The system 105 can have any combination of the various elements shown in FIG. 1. Further, the system 105 can have additional elements to those shown in FIG. 1. In some arrangements, the system 105 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement the various processes described herein. The autonomous driving module 120 and/or the data store 115 can be components of the processor 110, or the autonomous driving module 120 and/or the data store 115 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain instructions.

The vehicle 100 can include a sensor system 125. The sensor system 125 can include one or more sensors. "Sensor" means any device, component and/or system that can detect, determine, assess, measure, quantify and/or sense something. In arrangements in which the sensor system 125 includes a plurality of sensors, the sensors can work independently from each other or one or more of the sensors can work in combination with each other. The sensor system 125 and/or the one or more sensors can be operatively connected to the processor 110, the data store 115, the autonomous driving module 120 and/or other element of the vehicle 100 and/or the autonomous driving system 105.

The sensor system 125 can include any suitable type of sensor. For example, the sensor system 125 can include one or more sensors configured to detect, determine, assess, measure, quantify and/or sense information about the vehicle 100. Alternatively or in addition, the sensor system 125 can include one or more sensors configured to detect, determine, assess, measure, quantify and/or sense information about an environment in which the vehicle 100 is located, including information about objects in the environment. Such objects may be stationary object or moving objects. Alternatively or in addition to one or more of the above examples, the sensor system 125 can include one or more sensors configured to detect, determine, assess, measure, quantify and/or sense the location of the vehicle 100. Various examples of these and other types of sensors will be described herein. It will be understood that the embodiments are not limited to the particular sensors described.

The sensor system 125 can include one or more sensors configured to detect, determine, assess, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more sensors configured to detect, determine, assess, measure, quantify and/or sense objects in the environment in which the vehicle 100 is located using radio signals (e.g. RADAR based sensors). In some arrangements, the one or more sensors can be configured to sense the speed and/or heading of such objects.

The sensor system 125 can include one or more sensors can be configured to detect, determine, assess, measure, quantify and/or sense objects in the environment in which the vehicle 100 is located using lasers. For instance, the sensors can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode.

The sensor system 125 can include a camera. "Camera" is defined as any device, component, and/or system that can capture an image. The camera can include a lens and an image capture element. The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capturing element may capture images in any suitable wavelength on the electromagnetic spectrum. The image capturing element may capture color images and/or grayscale images.

Alternatively or in addition to the above, the sensor system 125 can include other types of sensors. The processor 110 can be operable to control movements of one or more of the sensors of the sensor system 125. It should be noted that any of the sensors described herein can be provided in any suitable location with respect to the vehicle 100. For instance, one or more sensors can be located within the vehicle 100 and/or one or more sensors can be located on or exposed to the exterior of the vehicle 100.

The vehicle 100 can include an input system 130 for receiving input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135 for presenting information to the driver or passenger. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels or tires. Any suitable type of wheels or tires can be used. In one or more arrangements, the wheels or tires of the vehicle 100 can be configured to rotate differentially with respect to other wheels or tires. The wheels or tires can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

One example of an environment 200 in which the vehicle 100 can operate is shown in FIG. 2. The vehicle 100 can be traveling on a road 205. "Road" means a thoroughfare, route, path or way between two places and upon which a vehicle can travel. The road 205 may be paved or otherwise improved to facilitate travel by a vehicle thereon. In some instances, the road 205 may be unpaved or undeveloped. The road 205 may be a public road or a private road. The road 205 may be designated for one way travel (e.g. a one way street), or the road 205 can be designated for two way travel. The road 205 can include or be a part of one or more bridges, tunnels, supporting structures, junctions, crossings, interchanges, and toll roads. The road 205 can include a shoulder of a road. As used herein, "current road" means a road that a vehicle is traveling on at the present time.

The road 205 can include one or more travel lanes 210. A "travel lane" is a portion of a road that is designated for use by a single line of vehicles and/or a portion of a road that is being used by a single line of vehicles. In some instances, the one or more travel lanes 210 can be designated by markings on the road 205 or in any other suitable manner. In some instances, the one or more travel lanes 210 may not be marked.

FIG. 2 shows an example in which the road 205 includes two travel lanes 210. However, it will be understood that arrangements described herein are not limited to roads having two travel lanes. Indeed, arrangements described herein can be used in connection with roads having any number of travel lanes. Further, it should be noted that the vehicles in adjacent travel lanes may travel in the same direction, or the vehicles in adjacent travel lanes may travel in opposite directions.

The road 205 can include an exit event 215. As used herein, "exit event" means a portion of a determined travel route in which the vehicle leaves or separates from a current road with a change in direction. Examples of exit events include intersections, junctions, T-junctions, Y junctions, four ways turns, off ramps, onramps, roundabouts, drive ways, alleys, and/or forks. In some instances, the exit event may be controlled by a traffic control device (e.g. a traffic light). In some instances, the exit event may not have an associated traffic control device. The exit event can be at substantially 90 degrees relative to the current road. As used herein, the term "substantially" includes exactly the term it modifies and slight variations therefrom. Thus, the term "substantially 90 degrees" means exactly 90 degrees and slight variations therefrom. As a further example, the exit event can be angled at an acute angle with respect to the current road. Still further, the exit event can be angled at an obtuse angle with respect to the current road.

The exit event may be located on a driver side of the vehicle 100 or a passenger side of the vehicle 100. In the example shown in FIG. 2, the exit event 215 is a substantially 90 degree right hand turn. However, it will be understood that arrangements are not limited to such an exit event. It should be noted that the vehicle 100 may pass one or more things (e.g. intersections, junctions, etc.) along the travel route that could be potential exit events. However, if the vehicle 100 does not follow the exit event as part of the determined travel route (e.g. the vehicle 100 will not turn at a given intersection, junction, etc.), then such things are not considered to be exit events for that particular travel route.

As noted above, the vehicle 100 can be configured to detect objects surrounding the vehicle 100 in the environment 200. The surrounding object can be located in any direction with respect to the vehicle 100. The surrounding objects can include one or more other vehicles. The other vehicles may be autonomous vehicles or non-autonomous vehicles or any combination of autonomous and non-autonomous vehicles. For instance, the surrounding objects can include one or more forward vehicles 250, one or more rearward vehicles, one or more driver side vehicles, and/or one or more passenger side vehicles (not shown). "Forward vehicle" means a vehicle that is located in front of and in the same lane or substantially the same lane as the present vehicle (e.g. vehicle 100) and traveling in the same direction.

One or more of such other vehicles may be traveling in the same direction as the vehicle 100. Further, one or more of such other vehicles may be traveling in a different direction as the vehicle 100 (e.g. in one or more transverse directions or in the opposite direction to the vehicle 100). In some instances, one or more of the other vehicles may or may not be moving. For instance, there may be one or more parked, stopped, and/or disabled vehicles.

The surrounding objects can include non-vehicular objects. For instance, the non-vehicular objects can include people, animals, signs, and/or other objects. The non-vehicular objects can be stationary, or they can be moving.

In some arrangements, the surrounding objects can include all objects detected by the sensor system 125 within the range of the sensors. In some arrangements, the surrounding objects can be a subset of the objects detected by the sensor system 125, such as those objects that are detected to be within a predetermined distance from the vehicle 100. For instance, objects that are located beyond the predetermined distance can be ignored or otherwise filtered and thus effectively ignored.

Now that the various potential components of the vehicle 100 and the environment 200 in which the vehicle 100 may operate have been described, one manner of determining driving actions for the vehicle 100 at exit events, such as the exit event 215 shown in FIG. 2 will be presented. Referring now to FIG. 3, an example of a method 300 of determining driving actions at exit events is shown. Various possible steps of method 300 will now be described. The method 300 illustrated in FIG. 3 may be applicable to the embodiments described above in relation to FIGS. 1 and 2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

Various possible steps of method 300 will now be described. At block 305, a travel route for the vehicle 100 can be determined. The "travel route" is a way that a vehicle can take to reach a predetermined destination. The travel route can be fixed, that is, once a route has been determined or selected, the travel route does not change. Alternatively, at least a portion of the travel route can be altered or adjusted in real time or at any suitable interval based on current information. As used herein, the term "real time" means a level of processing responsiveness that a driver or passenger or system senses as sufficiently immediate for a particular process or determination to be made, or that enables the processor to keep up with some external process. For instance, a travel route can be altered or adjusted if information received indicates that a road or a portion of the road on the determined travel route is closed due to an accident, flooding or other reason.

The travel route can be determined in any suitable manner. In some arrangements, the travel route can be input, determined, created and/or selected by a driver or passenger (e.g. a person). In some arrangements, the travel route can be created, determined and/or selected by the autonomous driving system 105, such as by the processor 110, the navigation system 180 and/or the autonomous driving module 120. There can be one or more exit events along the determined travel route.

At block 310, objects surrounding the vehicle 100 can be detected. Such detection can be performed by one or more sensors of the sensor system 125. In some arrangements, such detecting can be performed continuously while the vehicle 100 is traveling on the travel route or for at least a portion thereof. In some arrangements, such detecting can at any suitable interval while the vehicle 100 is traveling on the travel route or for at least a portion thereof.

At decision block 315, an exit event along the determined travel route or a current road of the determined travel route can be identified. Such identification can be performed in any suitable manner. The identification can be made at any time and/or at any spatial point along the travel route or current road. For instance, the identification can be made at the time the travel route is initially determined. As another example, the identification can be made when it is determined that the vehicle 100 is located on a road with an exit event or when the vehicle 100 is within a predetermined distance from the exit event.

If no exit event is identified along the determined travel route or the current road of the determined travel route, the method 300 can end, or it can return to block 305. However, if an exit event is identified, then the method 300 can continue to decision block 320.

At decision block 320, it can be determined whether there are one or more forward vehicles between the vehicle 100 and the exit event. Such a determination can be made using one or more of the sensors of the sensor system 125 and/or the processor 110. If no forward vehicles are detected, then the method 300 can end, or it can return to block 305. If one or more forward vehicles are detected, then the method 300 can continue to decision block 325.

At decision block 325, it can be determined whether passing the one or more forward vehicles is available or unavailable to the vehicle 100. The determination of availability or unavailability includes assessing whether there is an opportunity for the vehicle 100 to pass the one or more forward vehicles based on the presence of one or more passing lanes (e.g. one or more travel lanes that can be used to pass the one or more forward vehicles). "Availability" means that the vehicle can pass the one or more forward vehicles based at least on the presence of one or more passing lanes. Conversely, "unavailability" means that the vehicle cannot pass the one or more forward vehicles based at least on the absence of a passing lane.

It should be noted that the determination of availability or unavailability can also be based on one or more other detected conditions or factors. Examples of such other detected conditions or factors include, for example, the presence of surrounding vehicles (e.g. vehicles in the one or more passing lanes, in the current travel lane of the vehicle 100 and/or in other travel lanes), the speed of the surrounding vehicles, the travel direction of the surrounding vehicles, surrounding objects, weather conditions, and/or road conditions. For instance, if the current road has only one travel lane, then it may be determined that it is not possible to pass the one or more forward vehicles before the exit event because there is no travel lane available for passing. As a result, it would be determined that passing the one or more forward vehicles is unavailable. Alternatively, if the current road has more than one travel lane, then it may be determined that it is not possible to pass the one or more forward vehicles before the exit event if other vehicles are detected in the other travel lane. Again, it may be determined that passing the one or more forward vehicles is unavailable in such circumstances. However, if the current road has more than one travel lane and, for example, no other vehicles are detected in an adjacent travel lane to the current travel lane of the vehicle 100, then it may be determined that passing the one or more forward vehicles is available.

If it is determined that passing the one or more forward vehicles is unavailable, the vehicle 100 can be caused to remain behind the one or more forward vehicles at block 330. "Remain behind" means that the vehicle 100 continues to follow the one or more forward vehicles in the same travel lane. "Remain behind" includes stopping or following the one or more forward vehicles. If it is determined that passing the one or more forward vehicles is available, the method 300 can continue to decision block 335.

The distance between the one or more forward vehicles and the exit event can be determined in any suitable manner (e.g. using the sensor system 125 and/or any other vehicle system 145, device and/or component). The speed of the one or more forward vehicles can also be determined. At decision block 335, it can be determined whether the one or more forward vehicles are sufficiently or insufficiently distant from the exit event. "Sufficiently distant" means that, based at least on the distance between the exit event and the one or more forward vehicles and/or the speed of the one or more forward vehicles, the vehicle 100 can pass the one or more forward vehicles with adequate time and/or distance for the vehicle 100 to safely take the exit event. Conversely, "insufficiently distant" means that the vehicle 100 cannot pass the one or more forward vehicle with adequate time and/or distance for the vehicle 100 to safely take the exit event. "Pass the one or more forward vehicles" means the vehicle 100 leaves its present travel lane, passes the one or more forward vehicles in another travel lane, and returns to the present travel lane in front of the one or more forward vehicles. While in at least some instances the determination of availability or unavailability of passing the one or more forward vehicles and the determination of sufficiency or insufficiency of distance may take into account at least some of the same factors, the determinations are separate and the ultimate determination is different.

If it is determined that the one or more forward vehicles are sufficiently distant from the exit event, it can be determined that the suitable driving action is passing the one or more forward vehicles. The vehicle 100 can be caused to pass the one or more forward vehicles at block 340. In one or more arrangements, the processor 110 and/or the autonomous driving module 120 can cause the vehicle 100 to pass the one or more forward vehicles. The processor 110 and/or the autonomous driving module 120 can be operatively connected to one or more of the vehicle systems to implement the determined driving action. In one or more arrangements, the processor 110 and/or the autonomous driving module 120 can be operable to control the one or more actuators 140, which can control one or more of the vehicle systems 145 or portions thereof to implement the determined driving action.

If it is determined that the one or more forward vehicles are not sufficiently distant from the exit event, then method 300 can continue to block 345. At block 345, a driver or other passenger of the vehicle 100 can be prompted to select a driving action. The driver or other passenger can be prompted in any suitable manner. For instance, the prompt can be displayed on a display in the vehicle 100. Alternatively or in addition, the prompt can be audibly output to the driver or other passenger over one or more auditory channels. Other forms of prompting can be used as an alternative or in addition to these forms of prompting.

In one or more arrangements, the prompting can include a set of predefined driving actions for the driver or passenger to select from. The term "set of predefined driving actions" includes one or more predefined driving actions. For instance, the driver or passenger can be prompted to select passing the one or more forward vehicles before the exit event or remaining behind the one or more forward vehicles before the exit event. In some arrangements, the prompt may not include predefined driving actions. Instead, the driver or passenger can input a desired driving action.

The driver or passenger can input a selected or desired driving action in any suitable manner. For instance, the driver or passenger can input the selection using one or more components of the input system 130. As an example, the driver or passenger can input a selection through a touch screen, button, switch or other in-vehicle user interface element. In some arrangements, the driver or passenger can input a selection through engagement with one or more vehicle components (e.g. turn signal, brake pedal, gas pedal, etc.). A "user interface element" is defined as a component or a group of components that enables a user to interact with a machine. In one or more arrangements, the driver or passenger can input a selection by speaking the selected or desired driving action.

If a driving action selection is not received, the driving action can be determined to be remaining behind the one or more forward vehicles or another system default driving action. The vehicle 100 can be caused to remain behind the one or more forward vehicles at block 330. In some arrangements, a predetermined amount of time can be given for the driver or passenger to select a driving action. The predetermined amount of time can be any suitable amount of time. The predetermined amount of time can vary depending on the circumstances in the environment. If a driving action selection is not received within the predetermined amount of time, the driving action can be determined to be remaining behind the one or more forward vehicles or another system default driving action If a driving action selection is received (e.g. within the predetermined amount of time or otherwise), the method 300 can continue to block 355. At block 355, the vehicle 100 can be caused to implement the selected driving action. In one or more arrangements, the processor 110 and/or the autonomous driving module 120 can cause the vehicle 100 to implement the selected driving action. The processor 110 and/or the autonomous driving module 120 can be operatively connected to one or more of the vehicle systems 145 to implement the selected driving action. In one or more arrangements, the processor 110 and/or the autonomous driving module 120 can be operable to control the one or more actuators 140, which can control one or more of the vehicle systems 145 or portions thereof to implement the selected driving action. The method 300 can end, or it can return to block 305.

It will be appreciated that arrangements described herein can provide numerous benefits, including one or more of the benefits mentioned herein. For example, arrangements described herein can reduce driver or passenger input. As another example, arrangements described herein can improve the performance of an autonomous vehicle. As a still further example, arrangements described herein can improve vehicle safety.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, a determination that is "based on at least one of a determined availability or unavailability of passing the at least one forward vehicle and a determined sufficiency or insufficiency of distance between the at least one forward vehicle and the exit event" means that the determination can be made based on any of the following: (a) a determined availability or unavailability of passing the at least one forward vehicle, (b) a determined sufficiency or insufficiency of distance between the at least one forward vehicle and the exit event, or (c) both a determined availability or unavailability of passing the at least one forward vehicle and a determined sufficiency or insufficiency of distance between the at least one forward vehicle and the exit event (e.g. availability and sufficiency, availability and insufficiency, unavailability and sufficiency, or unavailability and insufficiency).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of determining a driving action for an autonomous vehicle, comprising:

identifying an exit event along a current road of a travel route of the autonomous vehicle;

detecting at least one forward vehicle between the autonomous vehicle and the exit event;

determining, using a processor, a driving action to take relative to the at least one forward vehicle based on at least one of a determined availability or unavailability of passing the at least one forward vehicle and a determined sufficiency or insufficiency of distance between the at least one forward vehicle and the exit event; and causing the autonomous vehicle to implement the determined driving action.

2. The method of claim 1, wherein, responsive to the determined availability of passing the at least one forward vehicle and the determined sufficiency of distance between the at least one forward vehicle and the exit event, determining the driving action to be passing the at least one forward vehicle.

3. The method of claim 1, wherein, responsive to the determined unavailability of passing the at least one forward vehicle, determining the driving action to be remaining behind the at least one forward vehicle.

4. The method of claim 1, wherein, responsive to the determined availability of passing the at least one forward vehicle and the determined insufficiency of distance between the at least one forward vehicle and the exit event, prompting an occupant of the autonomous vehicle to select a driving action.

5. The method of claim 4, wherein, responsive to receiving a selected driving action from the occupant of the autonomous vehicle, determining the driving action to be the selected driving action.

6. The method of claim 4, wherein, if a driving action is not selected within a predetermined period of time, determining the driving action to be remaining behind the at least one forward vehicle.

7. A system for an autonomous vehicle comprising:

a sensor system configured to detect at least one forward vehicle between an autonomous vehicle and an exit event along a current road of a travel route of the autonomous vehicle;

a processor operatively connected to the sensor system, the processor being programmed to initiate executable operations comprising:

determining a driving action to take relative to the at least one forward vehicle based on at least one of a determined availability or unavailability of passing the at least one forward vehicle and a determined sufficiency or insufficiency of distance between the at least one forward vehicle and the exit event; and causing the autonomous vehicle to implement the determined driving action.

8. The system of claim 7, wherein, responsive to the determined availability of passing the at least one forward vehicle and the determined sufficiency of the distance between the at least one forward vehicle and the exit event, determining the driving action to be passing the at least one forward vehicle.

9. The system of claim 7, wherein, responsive to the determined unavailability of passing the at least one forward vehicle, determining the driving action to be remaining behind the at least one forward vehicle.

10. The system of claim 7, wherein, responsive to the determined availability of passing the at least one forward vehicle and the determined insufficiency of distance between the at least one forward vehicle and the exit event, prompting an occupant of the autonomous vehicle to select a driving action.

11. The system of claim 10, wherein, responsive to receiving a selected driving action from the occupant of the autonomous vehicle, determining the driving action to be the selected driving action.

12. The system of claim 10, wherein, if a driving action is not selected within a predetermined period of time, determining the driving action to be remaining behind the at least one forward vehicle.

13. The system of claim 7, wherein the sensor system includes:

one or more first sensors configured to detect objects surrounding the autonomous vehicle; and one or more second sensors configured to detect the distance between the at least one forward vehicle and the exit event.

14. A computer program product for determining a driving action for an autonomous vehicle approaching an exit event, the computer program product comprising a computer readable storage medium having program code embodied therein, the program code executable by a processor to perform a method comprising:

identifying an exit event along a current road of a travel route of the autonomous vehicle;

detecting at least one forward vehicle between the autonomous vehicle and the exit event;

determining a driving action to take relative to the at least one forward vehicle based on at least one of a determined availability or unavailability of passing the at least one forward vehicle and a determined sufficiency or insufficiency of distance between the at least one forward vehicle and the exit event; and causing the autonomous vehicle to implement the determined driving action.

15. The computer program product of claim 14, wherein, responsive to the determined availability of passing the at least one forward vehicle and the determined sufficiency of distance between the at least one forward vehicle and the exit event, determining the driving action to be passing the at least one forward vehicle.

16. The computer program product of claim 14, wherein, responsive to the determined unavailability of passing the at least one forward vehicle, determining the driving action to be remaining behind the at least one forward vehicle.

17. The computer program product of claim 14, wherein, responsive to the determined unavailability of passing the at least one forward vehicle and the determined insufficiency of distance between the at least one forward vehicle and the exit event, prompting an occupant of the autonomous vehicle to select a driving action.

18. The computer program product of claim 17, wherein, responsive to receiving a selected driving action from the occupant of the autonomous vehicle, determining the driving action to be the selected driving action.

19. The computer program product of claim 17, wherein, if a driving action is not selected within a predetermined period of time, determining the driving action to be remaining behind the at least one forward vehicle.

* * * * *